Patented Feb. 23, 1954

2,670,329

UNITED STATES PATENT OFFICE 2,670,329

DRILLING MUDS AND METHODS OF USING SAME

Rufus V. Jones, Bartlesville, Okla., assignor to Phillips Petroleum Company, a corporation of Delaware No Drawing. Application August 3, 1950, Serial No. 177,573

19 Claims. (Cl. 252—8.5)

This invention relates to drilling muds. In one of its aspects it relates to a water-base drilling mud containing a water-soluble chitin derivative selected from the group consisting of the water-soluble salts of chitin sulfate, carboxymethylchitin and carboxyethylchitin. In another of its aspects it relates to a process for forming a filter cake from a drilling mud containing such a water-soluble chitin derivative. In still another of its aspects, this invention relates to a process for using such a water-soluble chitin derivative for controlling the viscosity, gel strength and fluid loss of a well drilling mud.

In the art of drilling wells, especially that of drilling wells by the rotary method, it is necessary to use a drilling fluid or drilling mud as is well understood in the art. In employing such a drilling mud, the procedure employed in the field for some years has been to start the drilling operation by circulating water through the drill string as a drilling fluid. The circulating water picks up clayey materials and other solids from the earthen formations penetrated as the drilling operation proceeds. Then this natural mudladen fluid is varied and controlled from time to time with the then existing demands for various properties thereof by adding certain materials as desired and by removing solids at the surface of the bore hole in a suitable settling zone, commonly designated as a "mud pit." One of the materials added to the drilling mud is ordinarily bentonite which, as is well understood in the art, is a clay type material having the property of swelling when contacted with water. The swelled bentonite is dispersed in the mud in the form of a colloidal suspension and carries upon its surface electrical charges, which charges determine at least some of the characteristics of the drilling mud. Other materials or additives can be added to the drilling mud in order to control the various properties thereof so that it can perform a multiplicity of interrelated functions. One of these functions is to cool and lubricate the drill stem and the drill bit. Another function is to carry the earthen cuttings derived from the drilling operation out of the bore hole. To perform the latter function, the drilling mud must have a viscosity which is low enough that it can be readily circulated in the bore hole and yet high enough that it can suspend cuttings from a drilling operation therein and prevent their settling while the mud is being passed from the bore hole to the settling zone or mud pit. In addition, the viscosity of the drilling mud must be such that the suspended cuttings can be settled therefrom during a suitable period of time in a mud pit. Further, the drilling mud performs the additional function of providing a filter cake on the walls of a bore hole to at least partially prevent the loss of fluid, particularly water, from the drilling mud into any porous formations adjacent the bore hole. If such fluid loss were not prevented, there would result a thick filter cake adjacent the porous formations encountered during the drilling operation with the result that local areas of very thick filter cake, i. e., "choking rings," would be built up on the walls of the bore hole thereby tending to bind the rotating drill string and preventing circulation of drilling mud through the well. Excessive fluid loss also results in the intrusion of water and mud into adjacent oil sands thereby driving back the oil from the bore hole and causing the porosity of the oil sand to be reduced to such an extent that the oil flow from the oil sand into the bore hole is prevented. Also high fluid loss will cause any natural bentonite formations or the like encountered during the drilling operation to swell and heave with the result that such formations are sloughed into the bore hole, thereby unduly ladening the drilling mud with suspended solids and, in extreme cases, preventing further circulation of the drilling mud or further rotation of the drilling string. Still further, high fluid losses result in the loss of clay and treating chemicals from the drilling mud and in the loss of water, which, in many dry regions, must be transported for many miles to the drilling site.

Still another function of the drilling mud is to hold the cuttings derived from the drilling operation in suspension when the drilling operation is stopped for any particular reason. Ordinarily, circulation of the drilling mud ceases upon each trip of the drilling string out of and into the well. Accordingly, the drilling mud must have a thixotropic property which permits it to set into a gel capable of holding the cuttings in suspension upon cessation of the circulation of the drilling mud in order to prevent the cuttings from settling to the bottom of the well where they would prevent rotation of the bit and would prevent circulation of the drilling mud. Further, the drilling mud must have the complementary thixotropic property of reverting from its gelled state to a pumpable fluid upon resumption of the drilling operation.

It is an object of this invention to provide a drilling mud adapted to be used in substantially all formations to form a filter cake having a reduced fluid loss therethrough and which has a proper viscosity and gel strength.

Another object is to provide an improved drilling mud.

Another object is to provide an improved process of drilling a well.

Still another object of this invention is to provide a process for forming a filter cake having a low rate of filtration of fluid therethrough.

Yet another object is to provide a drilling mud additive which can be incorporated into a drilling mud to insure that such drilling mud will have the necessary characteristics for forming a filter cake having a low fluid loss therethrough and to further insure that such drilling fluid will have a proper gel strength and viscosity.

Still yet another object of this invention is to provide a drilling mud containing a water-soluble chitin derivative selected from the group consisting of the water-soluble salts of chitin sulfate, carboxymethylchitin and carboxyethylchitin, adapted to regulate and control the rheological properties of such mud.

Various other objects, advantages and features of this invention will become apparent to one skilled in the art upon reading the specification and appended claims.

In the present invention, in order to realize these and other objects, it is preferred to employ in a drilling mud a water-soluble chitin derivative selected from the group consisting of carboxymethylchitin, carboxyethylchitin, chitin sulfate and the water-soluble salts thereof.

Chitin is a potentially cheap, complex organic material having an animal origin and is found in abundant quantities in the natural occurring shells or exoskeletons of such crustacea as lobsters, shrimps, crabs, wood lice, water fleas, barnacles and the like. The most generally accepted structure for chitin is

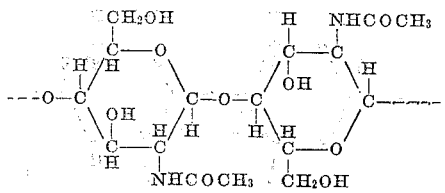

Although the constitution of chitin has not been definitely established, the above structural formula will be considered to be correct for the convenience of this disclosure. The chitin unit will be considered to be an N-acetyl-D-glucosamine, $C_8H_{13}O_5N$ having a unit molecular weight of approximately 203.

To prepare the drilling mud additives of this invention, chitin is reacted to form a substituted chitin which is soluble in water. Such reaction can be accomplished in a number of ways to produce a number of different water-soluble chitin derivatives. Chitin sulfate can be prepared by treating chitin with complexes of sulfur trioxide and certain organic compounds such as pyridine, dioxane, N,N - dimethylaniline or beta,beta-dichlorodiethyl ether. These complexes have been recognized in the art as definite compounds, although their exact molecular structure has not been established. The sulfating reaction can be carried out in a solvent comprising pyridine or other tertiary amine such as the picolines, N,N-dimethylaniline and the quinolines. Such solvent has the property of forming complexes or compounds with any acidic substances which might form in the reaction zone.

Either during or after the sulfation reaction a metal ion-yielding material, such as an alkaline earth metal salt or an alkali metal salt is added to obtain the corresponding salts of chitin sulfuric acid. Such metal ion-yielding material can be any water-soluble metal compound which yields metal ions, particularly the alkali metal and Group IIA metal salts and hydroxides such as sodium chloride, sodium bromide, sodium hydroxide, and their potassium and lithium analogues. Other representative ion-yielding materials are calcium, barium and magnesium chloride, ferric chloride, sodium oxalate, copper acetate and silver nitrate. Also, ammonium salts or hydroxide can be employed to produce the ammonium salt of chitin sulfate. The ion-yielding material can be included in the charge to the sulfating reaction or it can be added during the sulfating reaction, or to the reaction product either before or after the washing step.

The sulfation reaction is preferably effected under substantially anhydrous conditions. An auxiliary inert diluent can also be used when desired. Such diluent can comprise benzene, chlorohexane, hexane or other such hydrocarbon and admixtures thereof. A temperature within the range of 40 to 115° C. should be maintained during the sulfating reaction.

The sulfation product is preferably washed with benzene or other hydrocarbon to remove any excess amine and then again washed with an alcohol such as methanol or ethanol to remove excess sulfating agent. Such sulfating reaction and the products obtainable therefrom are more fully disclosed and claimed in my copending application, Serial No. 170,057, filed June 23, 1950, (Phillips Petroleum Case 3815).

Another water-soluble substituted chitin which can be employed in a drilling mud in accordance with this invention is carboxymethylchitin. Carboxymethylchitin can be prepared by first treating chitin with a strong, that is, from 20 to 60 weight per cent, preferably from 30 to 50 weight per cent, aqueous solution of sodium or potassium hydroxide for a period of about two hours at an elevated temperature, for example, one within the range of 60 to 180° F. The resulting alkali chitin can be pressed free from excess caustic and then boiled in water for a short period of time, say, fifteen minutes, and allowed to cool to room temperature. The alkali chitin can then be pressed free from water, dried and shredded. The resulting product is treated with monochloroacetic acid at a temperature within the range of about 20 to 40° F. The amount of monochloroacetic acid employed will depend upon the desired degree of substitution in the carboxymethylchitin product. Ordinarily, an amount of chloroacetic acid within the range of 0.5 to 3, preferably 1.5 to 2.5 parts by weight per part by weight of alkali chitin to be treated will be satisfactory. The reaction time can be varied in accordance with the reaction temperature and with the chloroacetic acid concentration to control the number of carboxymethyl groups introduced into the chitin molecules. A reaction time of from 30 minutes to 10 hours, preferably from 1 to 5 hours, will be satisfactory. The alkali metal, namely sodium, potassium or lithium, salts of the resulting carboxymethylchitin can be formed by adding to the reaction product, while in solution, a suitable alkali metal ion-yielding material. This can be an alkali metal salt or hydroxide such as sodium hydroxide, lithium hydroxide, potassium hydroxide or the like. An analogous ammonium hydroxide or salt can also be employed to obtain the corresponding ammonium carboxymethylchitin. The final product can be washed with distilled water to remove any unreacted monochloroacetic acid and/or excess ion-yielding material.

Still another water-soluble substituted chitin which can be employed in a drilling mud in accordance with this invention is carboxyethylchitin. Alkali chitin can be prepared as above and then dissolved in cold water (25 to 35° F.) to form a viscous solution thereof. Acrylonitrile is added to the solution in an amount within the range of 0.5 to 3, preferably from 0.8 to 2, parts by weight per part of alkali chitin. The exact amount of acrylonitrile employed will be determined by the specific reaction temperature employed, the reaction time and the degree of substitution desired for the carboxyethylchitin product. The reaction with acrylonitrile can be effected at a temperature within the range of 20° to 120° F. although a temperature within the range of 20° to 80° F. is usually preferred. A reaction time within the range of 0.5 to 10 hours is usually required depending upon the temperature employed and the degree of substitution desired. When the reaction is affected at a relatively low temperature within the above specified ranges, e. g. 20 to 50° F., cyanoethylchitin ether precipitates from solution substantially as it is formed and can be recovered therefrom by filtration before any appreciable hydrolysis occurs. When the precipitated cyanoethylchitin ether is permitted to remain in the reaction mixture, it will hydrolyze to the alkali metal carboxyethylchitin ether and redissolve. The alkali metal carboxyethylchitin ether can be recovered by evaporation of the water or preferably by precipitating it with an alcohol such as methanol or ethanol. A water-soluble ionizable alkali metal salt can be added to the reaction mixture to insure that sufficient alkali metal ions will be present to yield the desired alkali metal carboxyethylchitin. A resulting product can be dried for use in accordance with this invention by heating to a moderately elevated temperature within the range of 90 to 150° F., preferably under a subatmospheric pressure.

The intermediate product, namely cyanoethylchitin ether, can be recovered by filtration before any appreciable hydrolysis occurs and then washed with water to remove water-soluble impurities. It can then be redispersed in an acidic or an alkaline solution and hydrolyzed at room temperature to the carboxyethylchitin ether. Further, alkali metal carboxyethylchitin ether can be produced by hydrolyzing cyanoethylchitin ether in the presence of the corresponding alkali metal hydroxide or other salts thereof. Examples of such alkali metal hydroxides and salts are sodium, potassium and lithium hydroxide, chloride, bromide, nitrate and sulfate. Further, ammonium salts or hydroxide can be used. This procedure is preferred when it is desired to produce very pure products. Still further, this procedure can be employed to form an alkali metal carboxyethylchitin in situ in a drilling mud by simply adding cyanoethylchitin ether to the drilling mud in an amount equivalent to the desired concentration of carboxyethylchitin in the drilling mud.

The Group IB, IIB, IV, V, VI, VII and VIII metal salts of carboxyethylchitin can be prepared by adding a water-soluble salt of one of these metals to an aqueous solution of acid carboxyethylchitin ether and precipitating the product by the addition of alcohol, acetone, or a similar non-polar liquid. Or, such water-soluble salts can be added during the course of the acrylonitrile-alkali chitin reaction to form the corresponding metal salts in situ. Examples of these water-soluble salts include mercuric nitrate, manganous nitrate, stannous chloride, cadmium nitrate, bismuth nitrate, cobaltous chloride, antimonious chloride, nickelous sulfate, plumbous nitrate, ferric chloride, cuprous sulfate and chromic sulfate. Such salts of carboxyethylchitin can also be employed in the drilling muds of this invention.

The number of substituent groups introduced into the chitin molecule can be varied and will depend upon the specific reaction conditions employed and upon the substituent group which is to be introduced into the chitin molecule. The average number of substituent groups per chitin unit present in the substituted chitin molecule, as above defined, is expressed as the degree of substitution. In the practice of this invention, it is preferred to employ in a drilling mud a substituted chitin selected from the group consisting of the water-soluble salts of chitin sulfate, carboxymethylchitin and carboxyethylchitin which has a degree of substitution of sulfate, carboxymethyl or carboxyethyl groups, respectively, within the range of 0.1 to 2.0, preferably 0.2 to 1.5.

The amount of the substituted chitin of this invention employed in the drilling mud can be varied as even small amounts are effective although to a correspondingly smaller degree. However, as a general rule, the amount of such substituted chitin employed will ordinarily fall within the range of 1 to 10 pounds per barrel (42 gallons) of drilling mud, but, as will be well understood by those skilled in the art, the exact amount of substituted chitin employed to yield the required properties of the drilling mud can be varied from time to time and from well to well in accordance with then existing conditions. In order to determine the optimum amount of any particular substituted chitin to be added to any particular drilling mud under any given set of conditions, it is merely necessary, as is the common practice employing all types of drilling mud additives, to withdraw a portion of the drilling mud and to test it with various amounts of the particular substituted chitin incorporated therein in order to determine the exact amount necessary to yield the desired properties in a drilling mud and to avoid employing costly excessive amounts of such material. The drilling muds to which the concept of this invention is applicable include not only those which are derived from naturally occurring formations by circulating water through a well to pick up clays and other natural formations being drilled but also to muds synthetically prepared by adding any one or more of a variety of clayey materials and/or other additives to water. Such muds can comprise, for example, colloidally dispersed bentonite in either fresh or salt water and containing, if desired, various other clays, such as kaolin, as well as commonly used modifying agents, such as caustic-quebracho, and the various polyphosphates.

EXAMPLE I

The base muds used for these tests were prepared by dispersing the components thereof in water by means of high speed mixing. The compositions and per cents by weight are as follows:

|  | KB-10-F Mud | High Calcium EB-10-F Mud |
|---|---|---|
| Bentonite | 1.8 | 0.8 |
| Ezmix [1] |  | 8.0 |
| Kaolin | 18.0 |  |
| Barium sulfate | 17.5 | 26.2 |
| Calcium sulfate (anhyd.) |  | 0.17 |
| Water | 62.7 | 64.8 |

[1] A native Texas clay.

A salt-contaminated mud, EB-10-S, was obtained by the addition of 15.2 pounds of sodium chloride per barrel of the EB-10-F mud. The additives were dispersed as the air-dry powders with dosages corrected for moisture content. All muds were stirred 90 minutes after treatment and before testing in accordance with A. P. I. Code 29, July, 1942.

solution for two hours at room temperature (68° F.). The resulting alkali chitin was separated by filtration and dispersed in 100 grams of ice for 15–20 minutes to produce a clear viscous solution. To this viscous solution were added 10 cc. of acrylonitrile, and the mixture was shaken for 30 minutes in a closed flask. An opaque, curdy product formed which was tough. The reaction mixture stood for 24 hours at 28° F., and then at room temperature after adding 100 grams of water. The curdy precipitate slowly hydrolyzed, and after 64 hours, a translucent gel with only a few lumps resulted. This mass was stirred with more water until a clear solution was obtained. The solution was then poured slowly into 10 volumes of methanol per volume of solution and a precipitate formed. When filtered, the residue was gel-like. It was placed in a vacuum desiccator to remove some of the alcohol, and then redissolved in water. This water solution was precipitated in 95 per cent ethanol. Extraction was made with

*Table I*

| Additive | Additive, lb./bbl. | KB-10-F Mud API Code 29 Physical Properties | | | | |
|---|---|---|---|---|---|---|
|  |  | Viscosity, cps. | Initial gel strength, g. | 10-min. gel strength, g. | Water-loss, ml./30 min. | pH of Mud |
| 1 | .0 | 9 | 0 | 3 | 23.2 | 8.2 |
| 2 | 1 | 32 | 0 | 30 | 27 | 9.0 |
|  | 3 | 66 | 5 | 90 | 6.8 | 9.5 |
|  | 5 | >100 | 10 | 220 | 3.6 | 9.7 |
| 3 | 1 | 59 | 5 | 25 | 28 | 8.8 |
|  | 3 | 45 | 4 | 60 | 15 | 9.2 |
|  | 5 | 100 | 7 | 170 | 6.0 | 9.4 |
| 4 | 1 | 45 | 15 | 20 | 26 | 12.6 |
|  | 3 | 61 | 3 | 80 | 9.5 | 12.6 |
|  | 5 | 107 | 20 | 220 | 4.1 | 12.6 |
| 5 | 1 | 24 | 0 | 0 | 12.7 | 8.4 |
|  | 3 | 73 | 8 | 60 | 6.0 | 8.5 |
|  | 5 | >100 | 22 | 100 | 4.0 | 8.6 |

1. None.
2. Carboxymethylchitin, 1.1 degrees of substitution.
3. Carboxymethylchitin, 0.29 degree of substitution.
4. Carboxyethylchitin, 0.21 degree of substitution.
5. Chitin sulfate, 0.78 degree of substitution.

*Table II*

| Additive | Additive, lb./bbl. | EB-10-F Mud | | | | |
|---|---|---|---|---|---|---|
|  |  | Viscosity, cps. | Initial gel strength, g. | 10-min gel strength, g. | Water-loss ml./30 min. | ph of Mud |
| 1 | 0 | 8.0 | 12 | 15 | 66 | 8.3 |
| 2 | 1 | 24 | 25 | 20 | 59 | 8.3 |
|  | 2 | 41 | 40 | 70 | 31 | 8.3 |
|  | 5 | 51 | 20 | 85 | 9.8 | 8.4 |

1. None.
2. Chitin sulfate, 0.78 degree of substituion.

*Table III*

| Additive | Additive, lb./bbl. | EB-10-S Mud | | | | |
|---|---|---|---|---|---|---|
|  |  | Viscosity, cps. | Initial gel strength, g. | 10-min gel strength, g. | Water-loss ml./30 min. | ph of Mud |
| 1 | 0 | 8.5 | 12 | 15 | 62 | 8.0 |
| 2 | 1 | | | | | |
|  | 2 | 51 | 35 | 35 | 48 | 8.0 |
|  | 5 | 66 | 45 | 110 | 20 | 8.0 |

1. None.
2. Chitin sulfate, 0.78 degree of substitution.

EXAMPLE II

Ten grams of purified chitin were steeped in 200 grams of 40 weight per cent sodium hydroxide ethanol until the washings were free from alkali. The product was dried in vacuum over anhydrous calcium sulfate. The yield was 12.5 grams. A portion for analyses was dried in vacuum over P₂O₅ at 212° F. Analyses gave 2.2 per cent sodium which represents 0.21 carboxyethyl groups per N-acetylglucosamine unit.

It is understood that while certain theories have been advanced in the explanation of this invention, they are not the only or necessary ones but have been advanced only to facilitate the disclosure. Moreover, it is to be understood that this invention is not intended to be limited by any theories. It is further obvious that various changes or modifications can be made in the details disclosed herein without departing from the spirit of the invention or from the scope of the invention defined by the following claims. Obviously, use of the aqueous mud-laden fluid includes use in the aqueous phase of an oil emulsion or in mixtures of a non-aqueous material. It is to be understood that the invention is not to be limited to the specific details herein which were given for illustrative purposes. Tests with treating and control agents indicate that all the normal and usual treating and control agents of the well drilling fluid and well controlling mud arts can, after a mere routine test for lack of obvious adverse reactions, be employed without invention in the drilling and controlling muds of this invention, and that with few, if any, exceptions they will be so employable.

While the invention has been described in connection with a present, preferred embodiment thereof, it is to be understood that this description is illustrative only and is not intended to limit the invention, the scope of which is defined by the appended claims.

I claim:

1. A water base drilling mud composition comprising, in combination, sufficient water to maintain the mud as a fluid, sufficient clayey material to form a filter cake on the wall of the well and a water-soluble substituted chitin selected from the group consisting of the water-soluble salts of chitin sulfate, carboxymethylchitin and carboxyethylchitin in an amount sufficient to reduce the water loss due to filtration through said filter cake without increasing the viscosity of said drilling fluid to such an extent that it cannot be circulated.

2. A water base drilling mud composition comprising, in combination, sufficient water to maintain the mud as a fluid, sufficient clayey material to form a filter cake on the wall of the well and a water-soluble substituted chitin selected from the group consisting of the alkali metal salts of chitin sulfate, carboxymethylchitin and carboxyethylchitin in an amount sufficient to reduce the water loss due to filtration through said filter cake without increasing the viscosity of said drilling fluid to such an extent that it cannot be circulated.

3. A water base drilling mud composition comprising, in combination, sufficient water to maintain the mud as a fluid, sufficient clayey material to form a filter cake on the wall of the well and a water-soluble alkali metal salt of chitin sulfate in an amount sufficient to reduce the water loss due to filtration through said filter cake without increasing the viscosity of said drilling fluid to such an extent that it cannot be circulated.

4. The composition of claim 3 wherein said alkali metal salt of chitin sulfate is sodium chitin sulfate.

5. The composition of claim 3 wherein said alkali metal salt of chitin sulfate is potassium chitin sulfate.

6. A water base drilling mud composition comprising, in combination, sufficient water to maintain the mud as a fluid, sufficient clayey material to form a filter cake on the wall of the well and a water-soluble alkali metal carboxymethylchitin in an amount sufficient to reduce the water loss due to filtration through said filter cake without increasing the viscosity of said drilling fluid to such an extent that it cannot be circulated.

7. The composition of claim 6 wherein said alkali metal carboxymethylchitin is sodium carboxymethylchitin.

8. The composition of claim 6 wherein said alkali metal carboxymethylchitin is potassium carboxymethylchitin.

9. A water base drilling mud comprising, in combination, sufficient water to maintain the mud as a fluid, sufficient clayey material to form a filter cake on the wall of the well and a water-soluble alkali metal carboxyethylchitin in an amount sufficient to reduce the water loss due to filtration through said filter cake without increasing the viscosity of said drilling fluid to such an extent that it cannot be circulated.

10. A water base drilling mud comprising an aqueous fluid mixture containing suspended solids which form a filter cake on the wall of a well and a water-soluble substituted chitin selected from the group consisting of the water-soluble salts of chitin sulfate, carboxymethylchitin and carboxyethylchitin in an amount sufficient to reduce the water loss through said filter cake without increasing the viscosity of said drilling fluid to such an extent that it cannot be circulated.

11. A water base drilling mud comprising an aqueous fluid mixture containing suspended solids which form a filter cake on the wall of a well and a water-soluble substituted chitin selected from the group consisting of the water-soluble alkali metal salts of chitin sulfate, carboxymethylchitin and carboxyethylchitin in an amount sufficient to reduce the water loss through said filter cake without increasing the viscosity of said drilling fluid to such an extent that it cannot be circulated.

12. A water base drilling mud comprising an aqueous fluid mixture containing suspended solids which form a filter cake on the wall of a well and a water-soluble alkali metal chitin sulfate in an amount sufficient to reduce the water loss through said filter cake without increasing the viscosity of said drilling fluid to such an extent that it cannot be circulated.

13. A water base drilling mud comprising an aqueous fluid mixture containing suspended solids which form a filter cake on the wall of a well and a water-soluble alkali metal carboxymethylchitin in an amount sufficient to reduce the water loss through said filter cake without increasing the viscosity of said drilling fluid to such an extent that it cannot be circulated.

14. A water base drilling mud comprising an aqueous fluid mixture containing suspended solids which form a filter cake on the wall of a well and a water-soluble alkali metal carboxyethylchitin in an amount sufficient to reduce the water loss through said filter cake without increasing the viscosity of said drilling fluid to such an extent that it cannot be circulated.

15. A process for forming a filter cake having a low rate of filtration of fluid therethrough on the wall of a well by the deposition of colloidal clayey solids from a water base drilling mud circulated along said wall which comprises admixing with said drilling mud and interacting therewith a water-soluble substituted chitin selected from the group consisting of the water-soluble salts of chitin sulfate, carboxymethylchitin and carboxyethylchitin in an amount sufficient to decrease the rate of filtration of fluid through said filter cake but insufficient to increase the viscosity of said drilling mud to such an extent as to render it uncirculatable and then forming said filter cake from the resulting drilling mud.

16. The process of claim 15 wherein said substituted chitin is a water-soluble alkali metal salt of chitin sulfate.

17. The process of claim 15 wherein said substituted chitin is a water-soluble alkali metal carboxymethylchitin.

18. A process for preparing a cyanoethylchitin ether which comprises reacting alkali chitin with an amount of acrylonitrile within the range of 0.5 to 3 parts by weight per part of said alkali chitin at a temperature within the range of 20 to 120° F.

19. A process for preparing an alkali metal carboxyethylchitin ether which comprises reacting alkali chitin with an amount of acrylonitrile within the range of 0.5 to 3 parts by weight per part by weight of said alkali chitin at a temperature within the range of 20 to 120° F., recovering cyanoethylchitin ether as it is formed and then hydroylzing said cyanoethylchitin ether in the presence of an alkali metal ion-yielding material to produce said alkali metal carboxyethylchitin ether.

RUFUS V. JONES.

References Cited in the file of this patent

UNITED STATES PATENTS

| Number | Name | Date |
| --- | --- | --- |
| 2,072,771 | Rigby | Mar. 2, 1937 |
| 2,168,374 | Thor | Aug. 8, 1939 |
| 2,316,128 | Bock et al. | Apr. 6, 1943 |
| 2,349,797 | Bock et al. | May 30, 1944 |
| 2,425,768 | Wagner | Aug. 19, 1947 |
| 2,461,502 | Moe | Feb. 8, 1949 |
| 2,510,153 | Swinehart | June 6, 1950 |
| 2,520,161 | Moe | Aug. 29, 1950 |
| 2,536,113 | Wagner | Jan. 2, 1951 |
| 2,556,222 | Scarth | June 12, 1951 |
| 2,560,611 | Wagner et al. | July 17, 1951 |
| 2,560,612 | Wagner et al. | July 17, 1951 |
| 2,561,418 | Ryan | July 24, 1951 |